(12) United States Patent
Strong et al.

(10) Patent No.: US 10,537,215 B1
(45) Date of Patent: Jan. 21, 2020

(54) ICE SCRAPER WITH OFFSET CHIPPING TEETH

(71) Applicant: HOPKINS MANUFACTURING CORPORATION, Emporia, KS (US)

(72) Inventors: Lynn Curtis Strong, Auburn, KS (US); Kyle M. Bennett, Emporia, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 100 days.

(21) Appl. No.: 15/946,260

(22) Filed: Apr. 5, 2018

(51) Int. Cl.
| A47L 1/06 | (2006.01) |
| A47L 13/02 | (2006.01) |
| A47L 13/022 | (2006.01) |
| A47L 1/16 | (2006.01) |

(52) U.S. Cl.
CPC .................. *A47L 1/16* (2013.01); *A47L 1/06* (2013.01); *A47L 13/02* (2013.01); *A47L 13/022* (2013.01)

(58) Field of Classification Search
CPC ........... A47L 1/06; A47L 13/02; A47L 13/022
See application file for complete search history.

(56) References Cited

U.S. PATENT DOCUMENTS

| 3,051,975 | A | * | 9/1962 | Schwartz | .................. A47L 1/16 15/105 |
| 4,121,316 | A | * | 10/1978 | Perry | ........................ A47L 1/06 15/236.02 |
| 4,275,476 | A | * | 6/1981 | Hopkins | ................. B60S 3/045 15/236.02 |
| 4,546,513 | A | * | 10/1985 | Hammond | .............. B60S 3/045 15/105 |
| 4,748,711 | A | * | 6/1988 | Markus | .................... B60S 3/045 15/227 |
| 4,870,712 | A | * | 10/1989 | Markus | ..................... A47L 1/16 15/227 |
| 7,249,393 | B2 | * | 7/2007 | Marion | ..................... A47L 1/16 15/236.02 |
| 2013/0008464 | A1 | * | 1/2013 | Varner | ..................... A47L 1/06 134/6 |

* cited by examiner

*Primary Examiner* — Randall E Chin
(74) *Attorney, Agent, or Firm* — Hovey Williams LLP

(57) ABSTRACT

An ice scraper comprising a handle and a scraper head connected to the handle. The scraper head includes a proximal end, a distal end having a scraping edge, a scraping side, a chipping side, and at least three chipping teeth for chipping ice, hard snow, or frost from a curved surface. The chipping teeth extend outwardly from the chipping side. Each chipping tooth has a contact edge. At least one of the contact edges is offset forward or rearward of contact edges of two of the other chipping teeth so that at least one point of each contact edge can simultaneously contact the curved surface regardless of the scraper's position relative to the curved surface and regardless of a direction of the scraper.

19 Claims, 8 Drawing Sheets

ICE SCRAPER WITH OFFSET CHIPPING TEETH

BACKGROUND

Many scrapers, brushes, and other devices have been developed to remove snow, ice, and frost from vehicles. Typical scrapers have a scraping edge for removing snow, thin ice, and frost, and some also have aligned chipping teeth for chipping off chunks of thick ice and hard snow. However, these chipping teeth are often ineffective because most vehicle surfaces are curved, which prevents more than two chipping teeth from simultaneously contacting them. This significantly reduces the effectiveness of the chipping teeth and increases the amount of time required to remove thick ice and hard snow from vehicles.

SUMMARY

Embodiments of the invention solve the above-mentioned problems and provide a distinct advance in ice scrapers. More particularly, the invention provides an ice scraper that can more effectively chip ice, hard snow, or frost from a curved surface such as a vehicle windshield.

An embodiment of the ice scraper broadly comprises a handle and a scraper head affixed to one end of the handle. The scraper head distributes scraping or chipping forces along the curved surface and includes a proximal end, a distal end, a scraping side, a chipping side, a raised support, and at least three chipping teeth.

The proximal end is connected to the handle and tapers down to a diameter or width of the handle so as to form a monolithic piece. The distal end is substantially wider than the proximal end and terminates at a substantially straight scraping edge. The scraping side curves or is angled away or offset from a longitudinal axis of the handle for improved scraping ergonomics. The chipping side opposes and generally follows the curvature or angle of the scraping side.

The raised support extends from the scraping side and supports the chipping teeth. The raised support may include grips against which a user may press his thumb or forefinger to apply a downward force.

The chipping teeth extend outward from the raised support of the chipping side and engage the curved surface for chipping chunks of ice, hard snow, or frost off the curved surface. An embodiment of the ice scraper includes a middle chipping tooth, a left chipping tooth, and a right chipping tooth, but additional chipping teeth may be provided.

The middle chipping tooth is laterally centered on the scraper head between the left and right chipping teeth and includes a rearward face, a forward face, and a contact edge. The rearward face is angled toward the proximal end of the scraper head and the forward face is angled toward the distal end of the scraper head. The contact edge extends laterally between the rearward face and forward face. The contact edge is the farthest extending part of the middle chipping tooth such that only it can contact the curved surface.

The left chipping tooth is positioned to the left and in front of the middle chipping tooth but is otherwise substantially the same as the middle chipping tooth. That is, the left chipping tooth includes a rearward face, a forward face, and a contact edge. The contact edge of the left chipping tooth is the farthest extending part of the left chipping tooth such that only it can contact the curved surface. The contact edge of the left chipping tooth is offset forward of the contact edge of the middle chipping tooth, the purpose of which will be described below.

The right chipping tooth is positioned to the right and in front of the middle chipping tooth but is otherwise substantially the same as the left and middle chipping teeth. That is, the right chipping tooth includes a rearward face, a forward face, and a contact edge similar to the faces and edges of the middle and left chipping teeth. The contact edge of the right chipping tooth is the farthest extending part of the right chipping tooth such that only it can contact the curved surface. The contact edge of the right chipping tooth is offset forward of the contact edge of the middle chipping tooth, the purpose of which will be described below.

In use, the ice scraper may be held via the handle in a scraping orientation or a chipping orientation. In the scraping orientation, the scraping side of the scraper head faces the curved surface with the scraping edge contacting the curved surface. The ice scraper may then be thrust forward so that the scraping edge dislodges snow, sleet, frost, or other debris from the curved surface. The user may press his thumb or forefinger against the grips of the raised support for increasing forward thrust and downward pressure on the curved surface.

In the chipping orientation, the chipping side of the scraper head faces the curved surface with at least one point of each of the contact edges of the chipping teeth contacting the curved surface. The ice scraper may then be thrust forward so that the chipping teeth chip chunks of ice, hard snow, or frost off the curved surface.

Importantly, the curved surface can have curvature in more than one direction (such as a dome, bowl, or saddle shape) and at least one point of each of the contact edges can simultaneously contact the curved surface regardless of the position of the ice scraper on the curved surface and regardless of the direction the ice scraper is pointing. This distinguishes the ice scraper from prior art ice scrapers having aligned chipping teeth that are unable to simultaneously contact certain curved surfaces.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
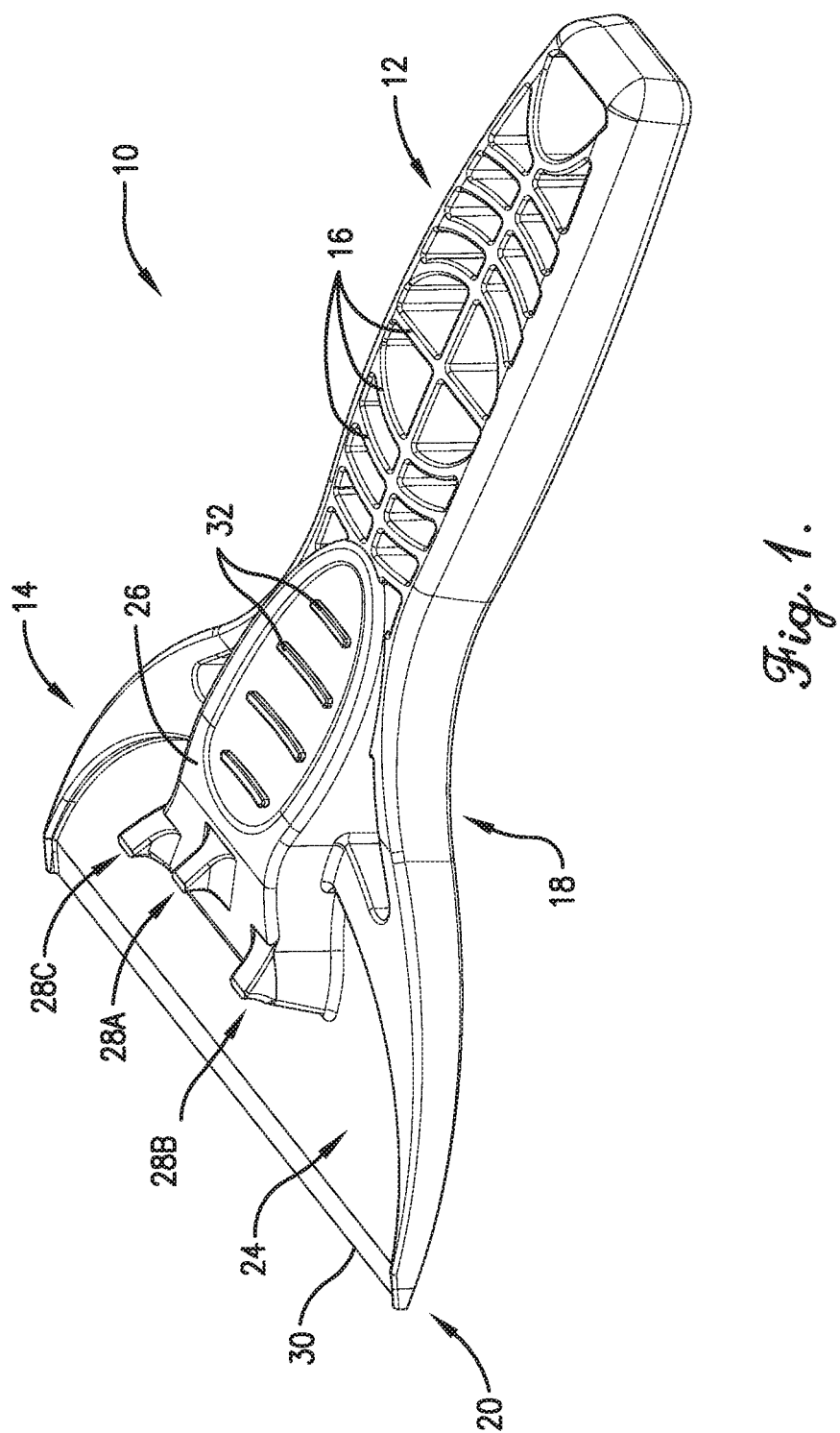
FIG. 1 is a perspective view of an ice scraper constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 2:
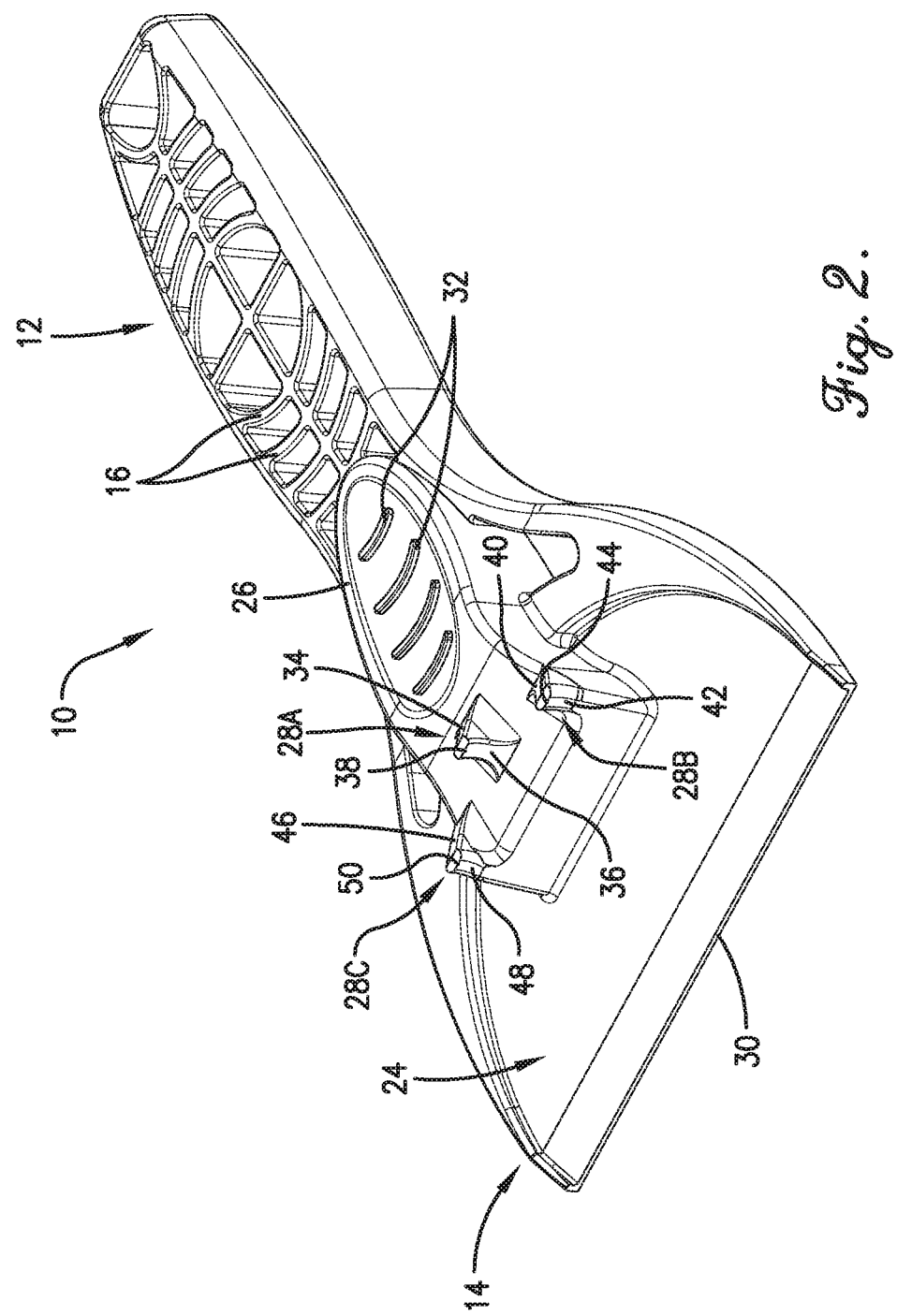
FIG. 2 is another perspective view of the ice scraper of FIG. 1.
Figure 3:
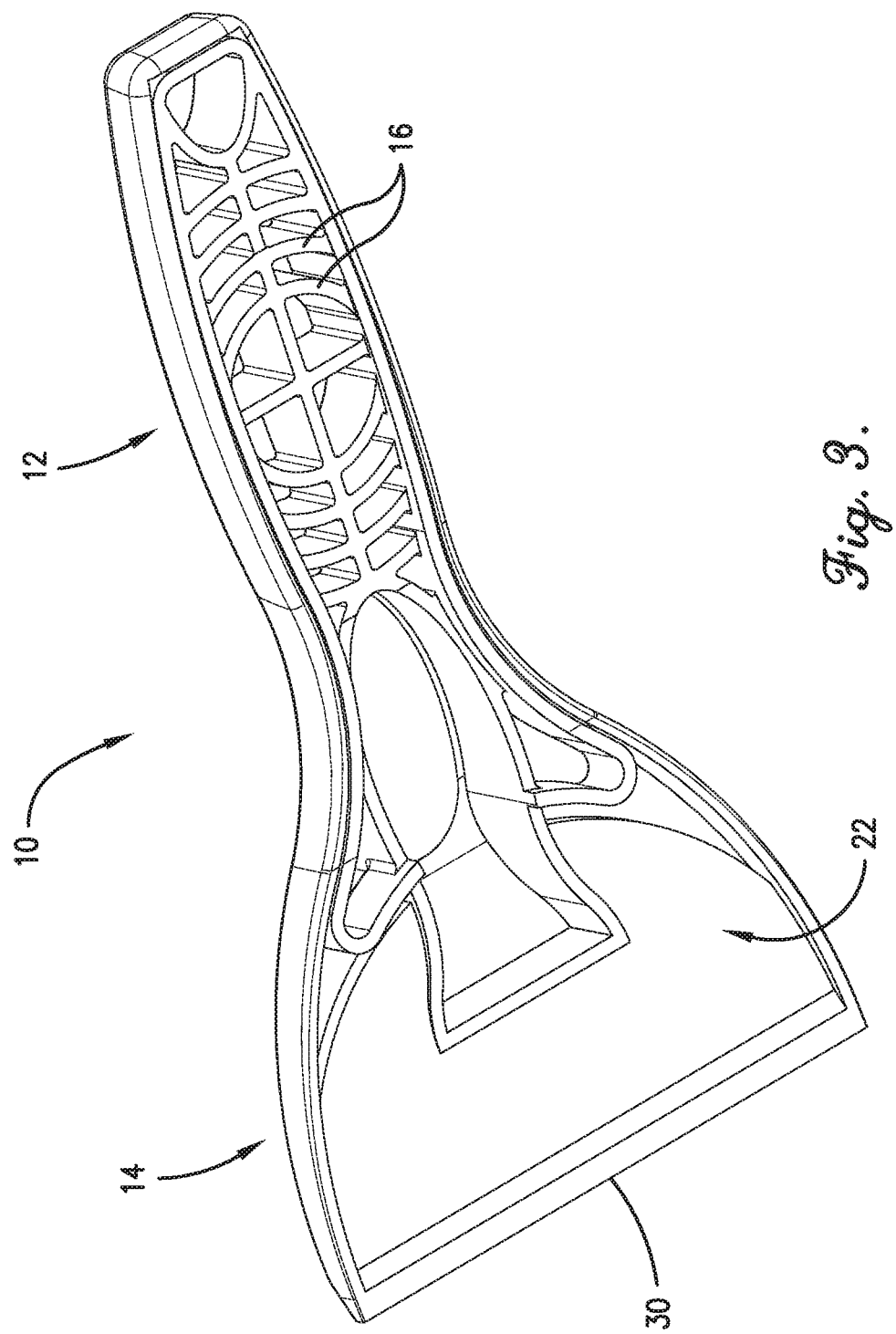
FIG. 3 is a bottom perspective view of the ice scraper of FIG. 1.

Turning to the drawing figures, and particularly FIGS. 1-3, an ice scraper 10 constructed in accordance with an embodiment of the invention is illustrated. The ice scraper 10 can be used to scrape and chip ice, frost, snow, and other debris from a vehicle window, a windshield, a side mirror, a headlight, or any other curved surface. The ice scraper 10 broadly comprises a handle 12, and a scraper head 14.

Figure 4:
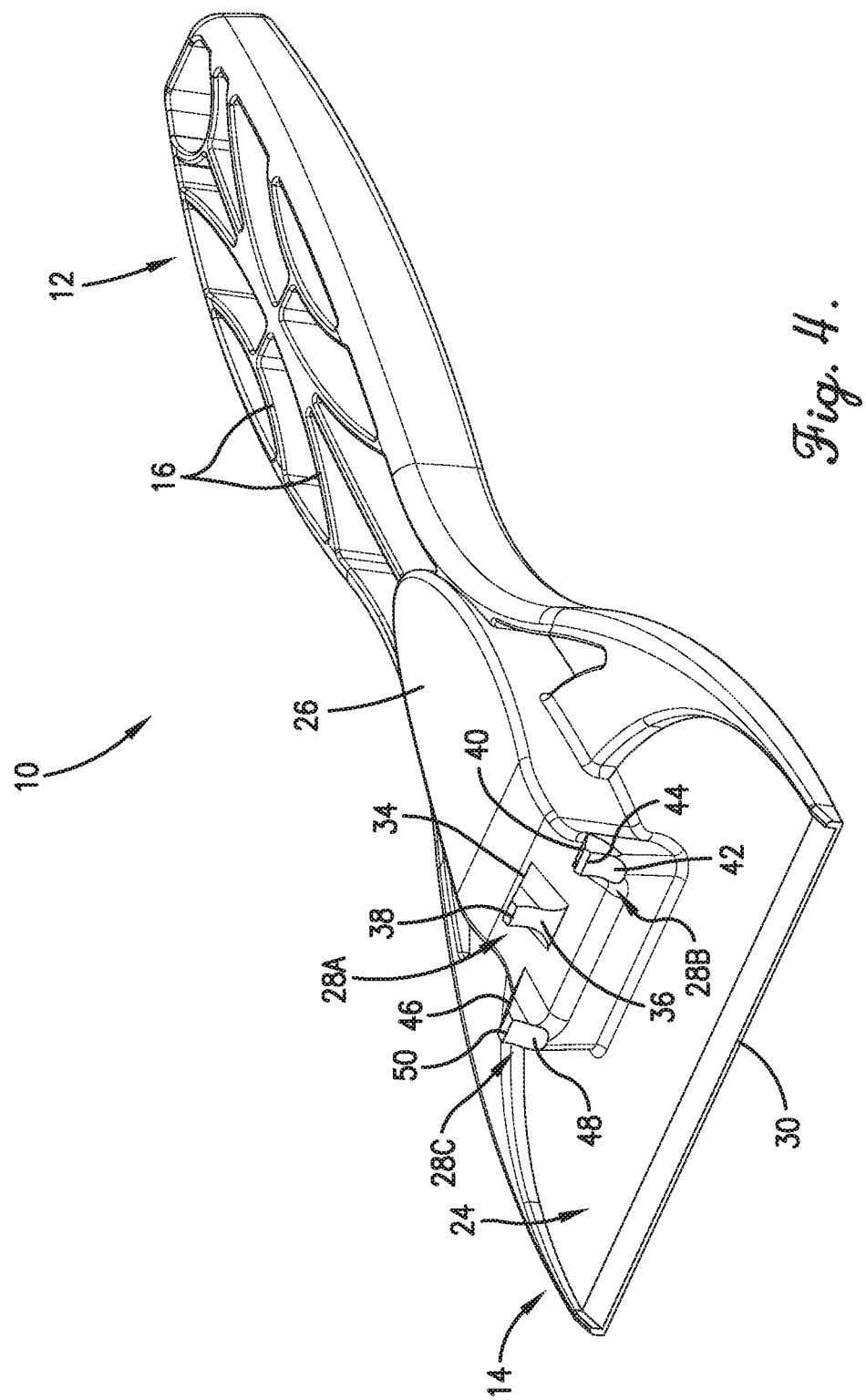
FIG. 4 is a perspective view of an ice scraper constructed in accordance with another embodiment of the invention.
Figure 5:
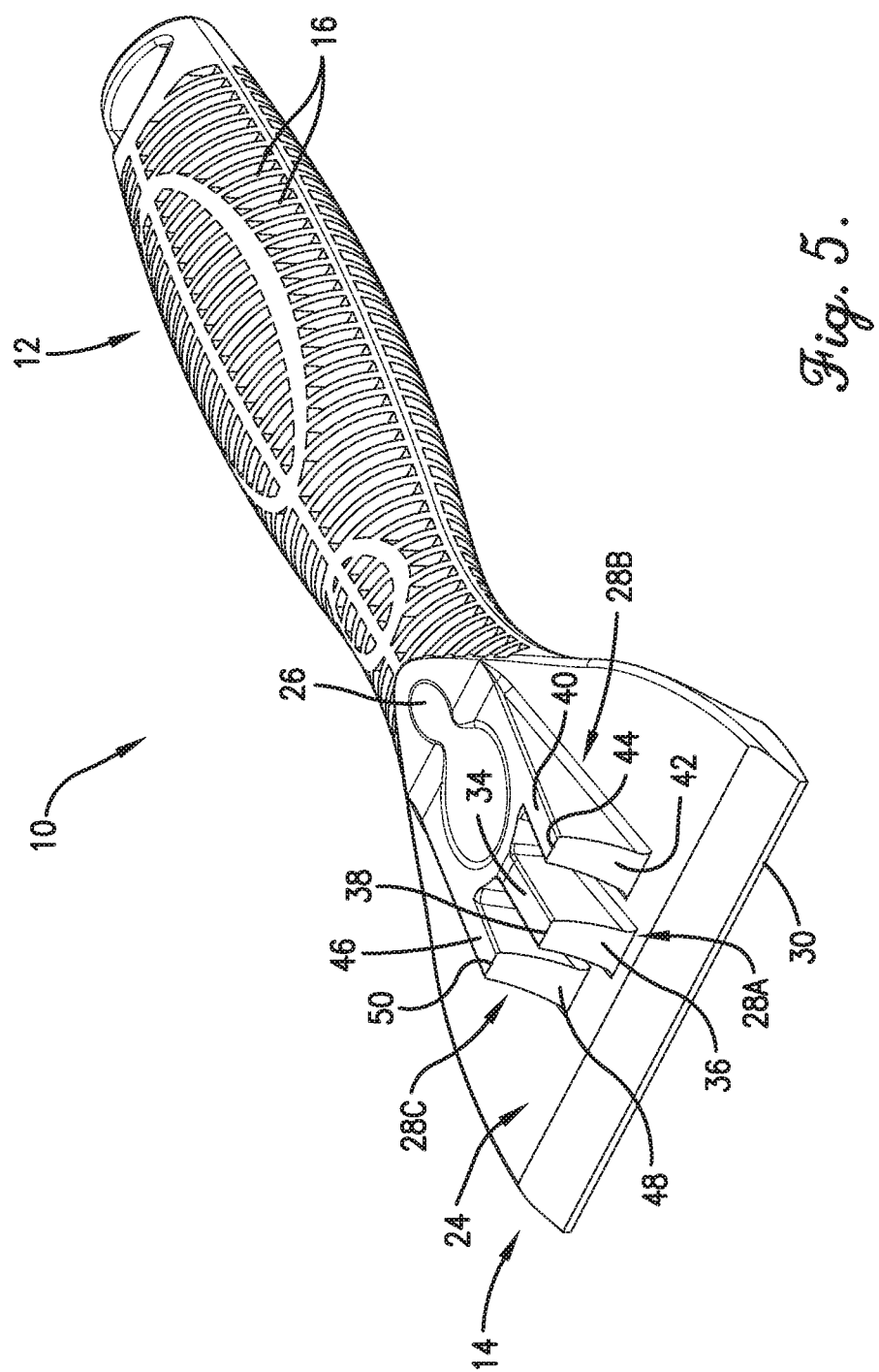
FIG. 5 is a perspective view of an ice scraper constructed in accordance with another embodiment of the invention.
Figure 6:
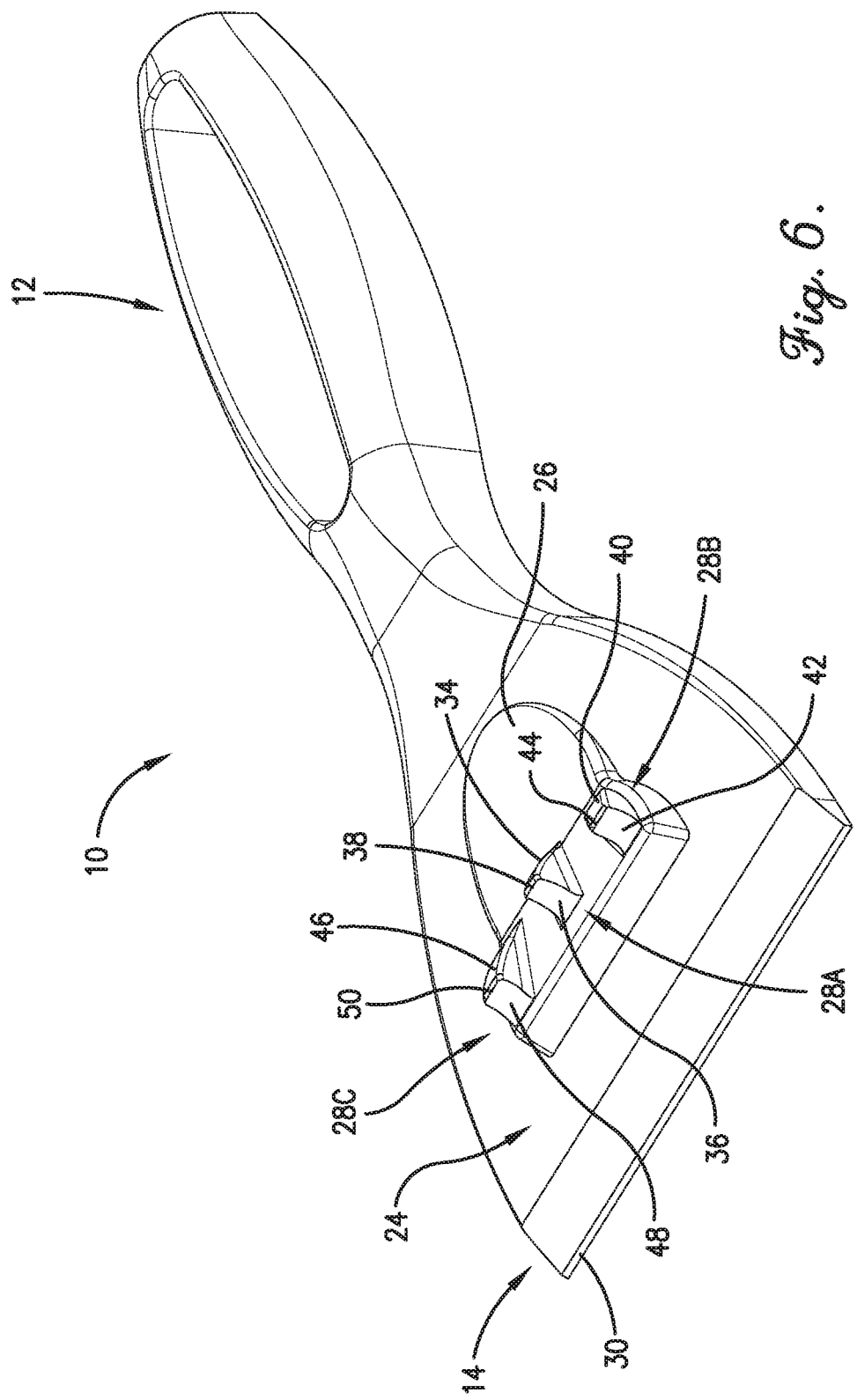
FIG. 6 is a perspective view of an ice scraper constructed in accordance with another embodiment of the invention.

The handle 12 allows a user to exert scraping or chipping forces along the curved surface and includes a plurality of ribs 16 for increasing the strength of the handle 12. The ribs 16 may have a circular pattern (FIGS. 1-3), a divergent pattern (FIG. 4), a cross-sectional slice pattern (FIG. 5), or any other suitable pattern. The handle 12 may also include one or more grip pads, a plurality of brush bristles, or any other suitable components. The grip pads may have a plurality of grooves, recesses, notches, or contours for cradling the user's fingers therein and may be formed of rubber, foam, or other soft material. The brush bristles may all extend from the handle 12 in one direction or in several directions for brushing light snow and other light debris from the curved surface. The handle 12 may be approximately twenty-four inches to approximately forty-eight inches long and approximately one inch to approximately two and one half inches in diameter. The handle 12 may be straight, curved, or contoured for improved grip and for improving force transfer of forces from the user's hands to the scraper head 14. The handle 12 may also be telescoping, collapsible, detachable, and reconfigurable for utilizing various attachments and components.

The scraper head 14 distributes scraping or chipping forces along the curved surface and includes a proximal end 18, a distal end 20, a scraping side 22, a chipping side 24, a raised support 26, and at least three chipping teeth 28A-C. The proximal end 18 is connected to the handle and tapers down in size to the diameter or width of the handle 12 so as to form a monolithic piece. Alternatively, the proximal end 18 may be connected to the handle 12 via connecting geometry or fasteners.

The distal end 20 is substantially wider than the proximal end and terminates at includes a substantially straight scraping edge 30 configured to engage the curved surface for scraping snow, sleet, frost, and other debris off the curved surface. To that end, the scraping edge 30 may be the common distal termination point of the scraping side 22 and chipping side 24 or may be the end of a scraping blade attached to the distal end 20 of the scraper head 14. In some embodiments, the scraping edge 30 may be biased toward the scraping side 22. The distal end 20 and hence the scraping edge 30 may be approximately two inches wide to approximately six inches wide. The distal end 20 may also gradually narrow in thickness to the scraping edge 30 or may have substantial thickness (approximately one eighth of an inch to one quarter of an inch).

The scraping side 22 curves or is angled away or offset from a longitudinal axis of the handle 12 for improved scraping ergonomics. The scraping side 22 may include secondary scraping edges or secondary chipping teeth configured to aid in removing ice, snow, or frost from the curved surface. The chipping side 24 opposes the scraping side 22 and may generally follow the curvature or angle of the scraping side.

The raised support 26 strengthens the scraper head 14 near the chipping teeth 28A-C and may extend from the proximal end 18 of the scraper head 14 to the chipping teeth 28A-C. The raised support 26 extends from the scraping side 22 and supports the chipping teeth 28A-C. In some embodiments, the raised support 26 may include grips 32 against which a user may press his thumb or forefinger to apply a downward force when the ice scraper 10 is in a scraping orientation as explained in more detail below. The grips 32 may be formed of rubber or textured material for increasing friction between the raised support 26 and the user's thumb or forefinger.

The chipping teeth 28A-C extend outward from the raised support 26 on the chipping side 24 and engage the curved surface for chipping off chunks of ice, hard snow, or frost. An embodiment of the ice scraper 10 includes a middle chipping tooth 28A, a left chipping tooth 28B, and a right chipping tooth 28C, although additional teeth may be provided.

Figure 7:
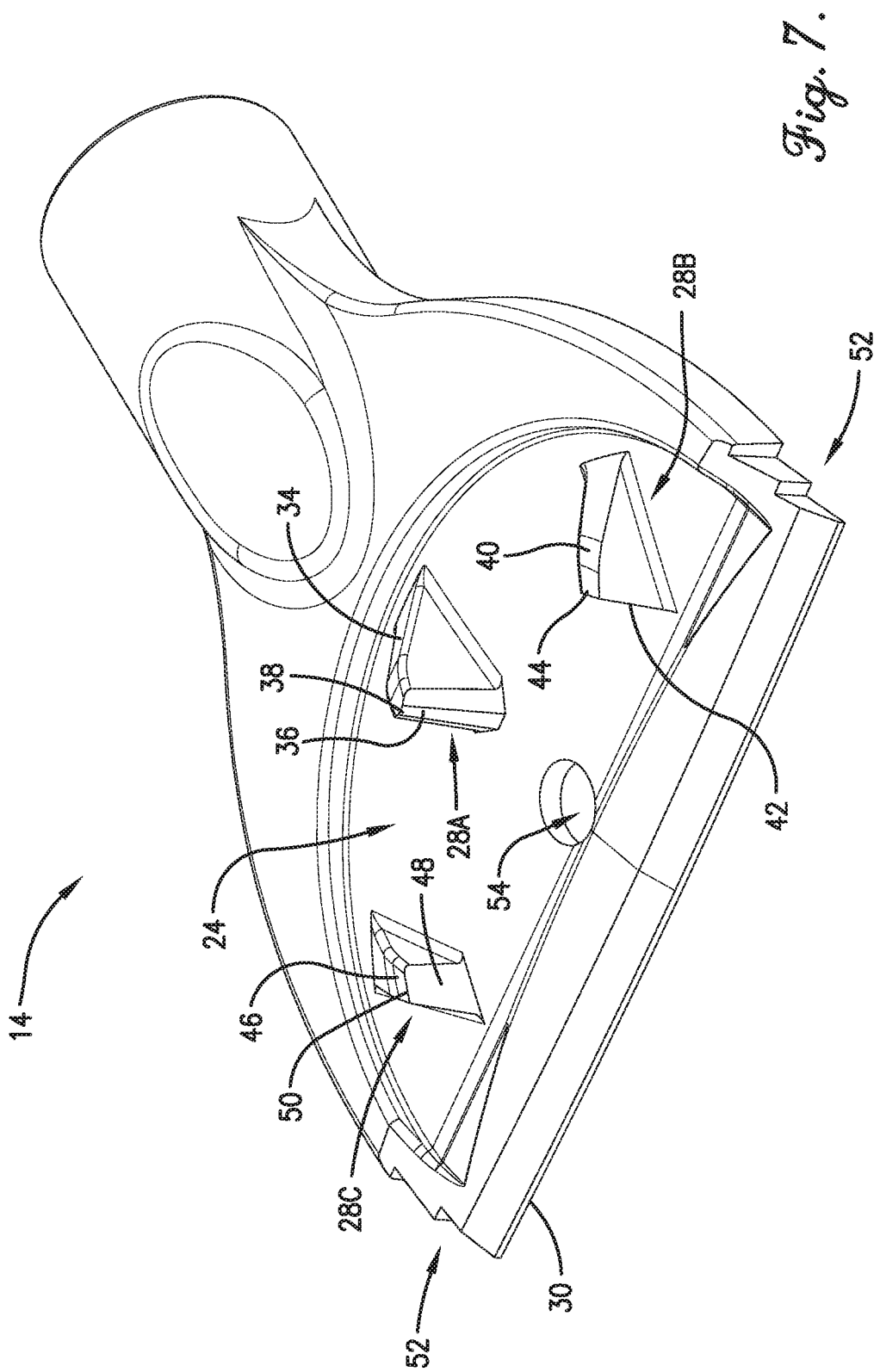
FIG. 7 is a perspective view of an ice scraper head constructed in accordance with another embodiment of the invention.
Figure 8:
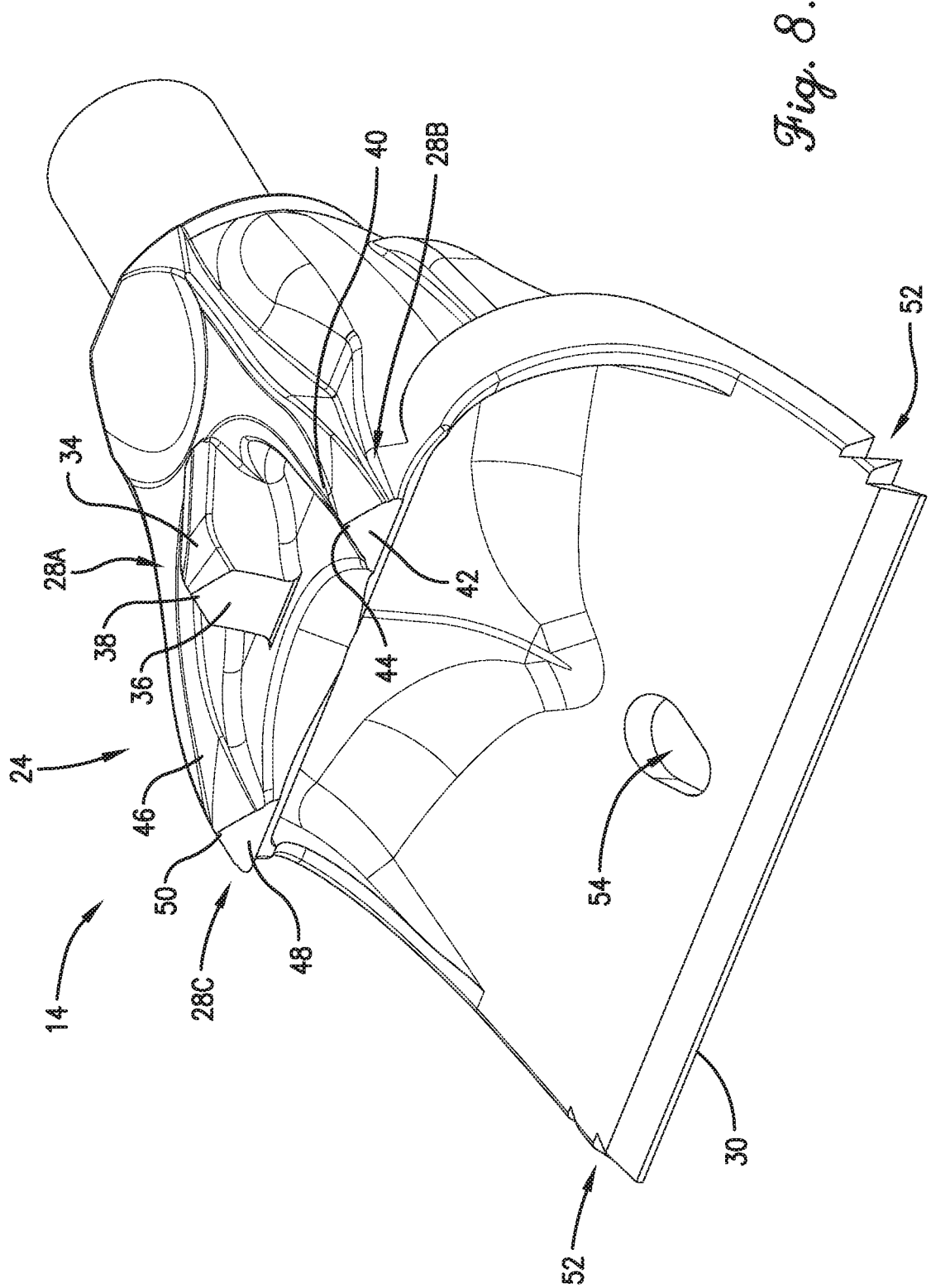
FIG. 8 is a perspective view of an ice scraper head constructed in accordance with another embodiment of the invention.

The middle chipping tooth 28A may be laterally centered on the scraper head 14 and includes a rearward face 34, a forward face 36, and a contact edge 38. The rearward face 34 is angled toward the proximal end 18 of the scraper head 14 and may be convex or arched outward for increasing strength of the middle chipping tooth 28A. Alternatively, the rearward face 34 may be substantially flat (FIG. 5) or may narrow to a point (FIG. 8). The forward face 36 is angled toward the distal end 18 of the scraper head 14 for engaging ice or other debris on the curved surface and may be concave or arched inward. Alternatively, the forward face 36 may be flat or composed of flat sections (FIG. 7). The contact edge 38 extends laterally along the middle chipping tooth 28A between the rearward face 34 and forward face 36 and may be substantially straight. The contact edge 38 is the farthest extending part of the middle chipping tooth 28A such that only a point or points of the contact edge 38 can contact the curved surface. Alternatively, the middle chipping tooth 28A may terminate at a contact point such that only the contact point can contact the curved surface.

The left chipping tooth 28B is positioned to the left of the middle chipping tooth 28A but is otherwise substantially the same as the middle chipping tooth 28A. That is, the left chipping tooth 28B may include a rearward face 40, a forward face 42, and a contact edge 44. The rearward face 40 is angled toward the proximal end 18 of the scraper head 14 and may be convex or arched outward for increasing strength of the left chipping tooth 28B. Alternatively, the rearward face 40 may be substantially flat (FIG. 5) or may narrow to a point (FIG. 8). The forward face 42 may be angled toward the distal end 18 of the scraper head 14 for engaging ice or other debris on the curved surface and may be concave or arched inward. Alternatively, the forward face 42 may be flat or composed of flat sections (FIG. 7). The contact edge 44 extends laterally along the left chipping tooth 28B between the rearward face 40 and forward face 42 and may be substantially straight. The contact edge 44 is the farthest extending part of the left chipping tooth 28B such that only a point or points of the contact edge 44 can contact the curved surface. Alternatively, the left chipping tooth 28B may terminate at a contact point such that only the contact point can contact the curved surface. The left chipping tooth 28B may be spaced in front of (FIGS. 1-4 and 6) or behind (FIG. 5) the middle chipping tooth 28A such that the contact edge 44 or contact point is offset forward or rearward of the contact edge 38 or contact point of the middle chipping tooth 28A, the purpose of which will be explained below.

The right chipping tooth 28C is positioned to the right of the middle chipping tooth 28A but is otherwise substantially the same as the left and middle chipping teeth 28A,B. That is, the right chipping tooth 28C includes a rearward face 46, a forward face 48, and a contact edge 50 similar to the faces and edges of the middle and left chipping teeth 28A,B. The rearward face 46 is angled toward the proximal end 18 of the scraper head 14 and may be convex or arched outward for increasing strength of the right chipping tooth 28C. Alternatively, the rearward face 46 may be substantially flat (FIG. 5) or may narrow to a point (FIG. 8). The forward face 48 may be angled toward the distal end 18 of the scraper head 14 for engaging ice or other debris on the curved surface and may be concave or arched inward. Alternatively, the forward face 48 may be flat or composed of flat sections (FIG. 7). The contact edge 50 extends laterally along the right chipping tooth 28C between the rearward face 46 and forward face 48 and may be substantially straight. The contact edge 50 is the farthest extending part of the right chipping tooth 28C such that only a point or points of the contact edge 50 can contact the curved surface. Alternatively, the right chipping tooth 28C may terminate at a contact point such that only the contact point can contact the curved surface. The right chipping tooth 28C may be spaced in front of (FIGS. 1-4 and 6) or behind (FIG. 5) the middle chipping tooth 28A such that the contact edge 50 or contact point is offset forward or rearward of the contact edge 38 or contact point of the middle chipping tooth 28A, the purpose of which will be explained below.

In some embodiments, the right chipping tooth 28C is identical to the left chipping tooth 28B or is a mirror image of the left chipping tooth 28B so as to form symmetry about the centerline of the scraper head 14. To that end, the left and right chipping teeth 28B,C may be angled away from each other, towards each other, or substantially parallel to each other. The left and right chipping teeth 28B,C may be positioned laterally from each other so that the contact edges 44, 50 are aligned with each other. It will also be understood that any one of the contact edges 38, 44, 50 may be offset forward or rearward of the contact edges of the other two teeth.

The scraper 10 may also include left and right sawblade teeth sets 52 and a socket 54, as shown in FIGS. 7 and 8. The left and right sawblade teeth sets 52 may be formed in the scraper head 14 near opposite ends of the scraping edge 30 for chipping ice and frost when the scraper 10 is in a scraping orientation as described in more detail below. Each sawblade teeth set 52 may include a number of teeth jutting outward for engaging the ice and frost. The socket 54 extends through the scraper head 14 near a middle of the scraper 10 for hanging the scraper 10 on a storage hook. The socket 54 may be circular (FIG. 7), tapered (FIG. 8), or any other suitable shape.

Use of the ice scraper 10 will now be described in more detail. First, the ice scraper 10 may be held via the handle 12 in a scraping orientation such that the scraping side 22 of the scraper head 14 faces the curved surface with the scraping edge 30 contacting the curved surface. The ice scraper 10 may then be thrust forward so that the scraping edge 30 dislodges snow, sleet, frost, or other debris from the curved surface. The user may press his thumb or forefinger against the grips 32 of the raised support 26 for increasing forward thrust and downward pressure on the curved surface.

The ice scraper 10 may also be held via the handle 12 in a chipping orientation such that the chipping side 24 of the scraper head 14 faces the curved surface with at least one point of each of the contact edges 38, 44, and 50 of the chipping teeth 28A-C contacting the curved surface. The ice scraper 10 may then be thrust forward so that the chipping teeth 28A-C chip chunks of ice, hard snow, or frost off the curved surface.

Importantly, the curved surface can have curvature in more than one direction (such as a dome, bowl, or saddle shape) and at least one point of each of the contact edges 38, 44, 50 of the chipping teeth 28A-C can simultaneously contact the curved surface regardless of the position of the ice scraper 10 on the curved surface and regardless of the direction the ice scraper 10 is pointing. This distinguishes the ice scraper from prior art ice scrapers having aligned chipping teeth that are unable to simultaneously contact certain curved surfaces.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A scraper for removing ice, snow, or frost from a surface, the scraper comprising:
   a handle configured to be gripped by a user; and
   a scraper head affixed to one end of the handle, the scraper head comprising:
      a proximal end attached to the handle;
      a distal end opposite the proximal end, the distal end including a substantially straight scraping edge;
      a scraping side configured to face the surface when the scraper is in a scraping orientation;
      a chipping side configured to face the surface when the scraper is in a chipping orientation;
      at least three chipping teeth extending from the chipping side, each of the chipping teeth having a contact edge including a contact point, one of the contact edges being offset forward or rearward of the other contact edges such that the contact points of the contact edges can engage the surface simultaneously regardless of a position of the scraper relative to the surface and regardless of a direction of the scraper when the scraper is in the chipping orientation; and
a raised support on the chipping side, the chipping teeth being positioned on the raised support such that the raised support absorbs impact forces imparted on the chipping teeth.

2. The scraper of claim 1, the raised support including grips for allowing the user to impart thumb or forefinger pressure on the ice scraper when the ice scraper is in the scraping orientation.

3. The scraper of claim 1, the at least three chipping teeth including a middle chipping tooth, a left chipping tooth, and a right chipping tooth.

4. The scraper of claim 3, the middle chipping tooth being positioned on a centerline of the scraper.

5. The scraper of claim 4, the left chipping tooth and right chipping tooth forming symmetry about the centerline of the scraper.

6. The scraper of claim 3, the middle chipping tooth being positioned closer to the distal end of the scraper head than the left and right chipping teeth such that the contact edge of the middle chipping tooth is offset forward of the contact edges of the left and right chipping teeth.

7. The scraper of claim 3, the middle chipping tooth being positioned farther away from the distal end of the scraper head than the left and right chipping teeth such that the contact edge of the middle chipping tooth is offset rearward of the contact edges of the left and right chipping teeth.

8. The scraper of claim 3, the left and right chipping teeth being angled away from each other.

9. The scraper of claim 1, each contact edge being substantially straight.

10. The scraper of claim 9, the substantially straight contact edges extending parallel to each other.

11. The scraper of claim 10, the substantially straight contact edges of at least two of the chipping teeth being aligned with each other.

12. The scraper of claim 1, each chipping tooth having a curved forward surface.

13. The scraper of claim 1, each chipping tooth having a convex rearward surface.

14. The scraper of claim 1, each chipping tooth having a substantially flat rearward surface.

15. A scraper for removing ice, snow, or frost from a surface, the scraper comprising:
a handle configured to be gripped by a user; and
a scraper head affixed to one end of the handle, the scraper head comprising:
a proximal end attached to the handle;
a distal end opposite the proximal end, the distal end including a substantially straight scraping edge;
a scraping side configured to face the surface when the scraper is in a scraping orientation;
a chipping side configured to face the surface when the scraper is in a chipping orientation; and
exactly three chipping teeth extending from the chipping side, each of the chipping teeth having a contact edge including a contact point, one of the contact edges being offset forward or rearward of the other contact edges such that the contact points of the contact edges can engage the surface simultaneously regardless of a position of the scraper relative to the surface and regardless of a direction of the scraper when the scraper is in the chipping orientation.

16. The scraper of claim 15, the middle chipping tooth being positioned closer to the distal end of the scraper head than the left and right chipping teeth such that the contact edge of the middle chipping tooth is offset forward of the contact edges of the left and right chipping teeth.

17. The scraper of claim 15, the middle chipping tooth being positioned farther away from the distal end of the scraper head than the left and right chipping teeth such that the contact edge of the middle chipping tooth is offset rearward of the contact edges of the left and right chipping teeth.

18. The scraper of claim 15, the middle chipping tooth being positioned on a centerline of the scraper, the left chipping tooth and right chipping tooth forming symmetry about the centerline of the scraper.

19. A scraper for removing ice, snow, or frost from a surface, the scraper comprising:
a handle configured to be gripped by a user; and
a scraper head affixed to one end of the handle, the scraper head comprising:
a proximal end attached to the handle;
a distal end opposite the proximal end, the distal end including a straight scraping edge;
a scraping side configured to face the surface when the scraper is in a scraping orientation;
a chipping side configured to face the surface when the scraper is in a chipping orientation;
a raised support on the chipping side for absorbing chipping impact forces; and
exactly three chipping teeth extending outward from the raised support, the three chipping teeth including a middle chipping tooth, a left chipping tooth, and a right chipping tooth, each chipping tooth having a contact edge including a contact point, the middle chipping tooth being positioned on a centerline of the scraper, the left and right chipping teeth being positioned on either side of the middle chipping tooth and forming symmetry about the centerline, the contact edges of the left and right chipping teeth being offset forward or rearward of the contact edge of the middle chipping tooth such that the contact points of the contact edges can engage the surface simultaneously regardless of a position of the scraper relative to the surface and regardless of a direction of the scraper when the scraper is in the chipping orientation.

\* \* \* \* \*